Oct. 27, 1970          H. B. STEVENSON          3,536,794
METHOD OF MAKING THERMOMAGNETIC RECORDING MEMBERS
Filed May 8, 1967                        2 Sheets-Sheet 1
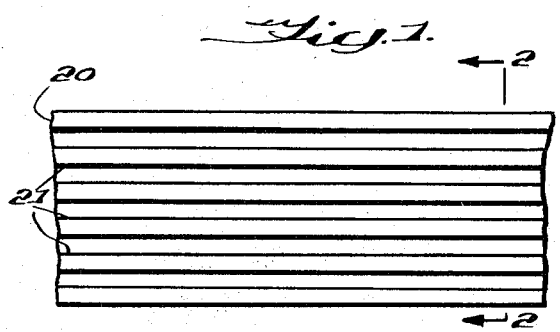
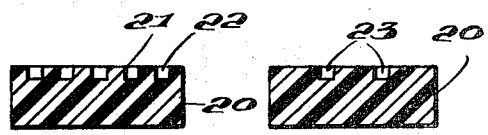
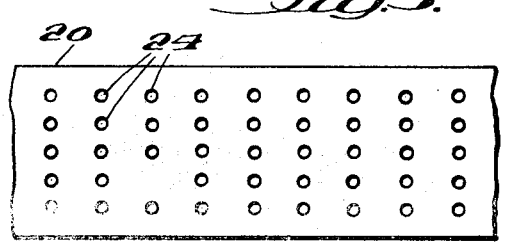
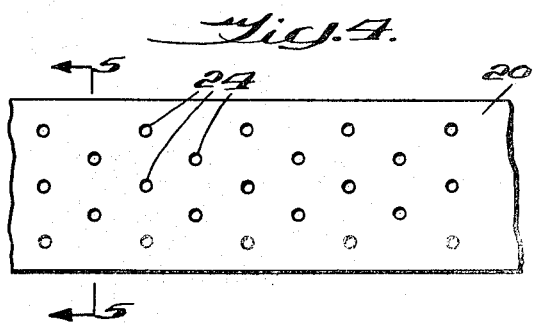
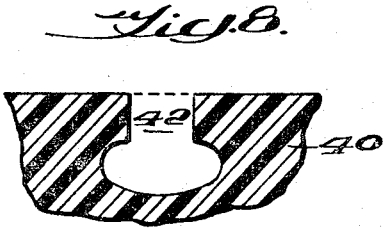
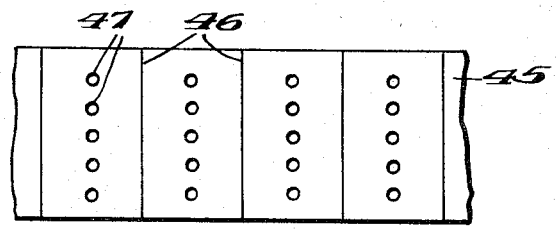

United States Patent Office 3,536,794
Patented Oct. 27, 1970

3,536,794
METHOD OF MAKING THERMOMAGNETIC RECORDING MEMBERS
Halsey B. Stevenson, Wilmington, Del., assignor to E. I. du Pont de Nemours and Company, Wilmington, Del., a corporation of Delaware
Filed May 8, 1967, Ser. No. 636,954
Int. Cl. B29d 3/00
U.S. Cl. 264—24                 12 Claims

ABSTRACT OF THE DISCLOSURE

Films for use in a thermomagnetic copying process can be made by forming a plastic film on an engraved master plate to produce a substrate film with an indented periodic pattern, and filling the indentations with a suspension of ferromagnetic particles in a second liquid film-forming plastic, then hardening the second liquid film-forming plastic, optionally in the presence of a magnetic field to orient the ferromagnetic particles.

FIELD OF THE INVENTION

This invention relates to a method of making thermomagnetic copying plates having response properties in thermographic copying or recording.

DESCRIPTION OF THE PRIOR ART

Belgian Pat. 672,017 teaches a new thermomagnetic reflex recording technique in which a magnetic image of a document can be obtained by placing the document in contact with a copying member composed of a substrate having a film of a hard magnetized magnetic material on the surface adjacent to the document and exposing the document to a pulse of radiation transmitted through the copying member. The temperature of the ferromagnetic elements in the copying member is thus driven close to the Curie temperature substantially uniformly over the surface of copying member by the pulse of radiation, and into or through the Curie range by selective reflection from the document so that the ferromagnetic element is partially or fully demagnetized selectively to form an image of the document. The magnetic image can then be developed by treatment with inks or toners containing magnetic particles, by electromagnetic readout, by magneto-optic equipment or other means.

An important class of documents are those readable by eye, i.e., those which selectively reflect visible electromagnetic radiation. To obtain faithful copies of such documents, a copying member substantially transparent to radiation is employed and a pulse of radiation is employed to form the magnetic image. The copying members required for this purpose thus require two properties; namely, a high flux strength of the magnetized material, and transparency, which properties are inherently contradictory in that the ferromagnetic particles which should be present in substantial amounts to develop the flux strength are opaque to the radiation. A solution to this difficulty is to dispose the ferromagnetic material in a substantially periodic pattern on the substrate, such as dots or lines, whereby radiation is transmitted through the transparent substrate between the magnetic elements.

The preferred distance between adjacent periodic structures is determined by a variety of factors. The spacing should be small in comparison with the characters or other image on the document to be copied in order to resolve detail. When the image is developed by a magnetic ink or toner, which is then transferred to another substrate such as paper to produce the copy, the resolution is determined in part by the degree of fineness of the particles of the ink or toner and to the degree which they are smeared. For the copying of documents, half-tone prints, and the like by the process of this invention, the spacing between the periodic magnetic material pattern units should be from about 100 to about 1500 lines/inch and preferably from 300 to 750 lines/inch at total depths of 0.1 to 1.0 and preferably 0.3 to 0.7 mil.

SUMMARY OF THE INVENTION

The process of the present invention for making a thermomagnetic recording member comprises:

(a) placing a first plastic film-forming material having at least its surface in a flowable condition upon the engraved surface of a master plate from which the material can readily be stripped and permitting the material to harden to a plastic film, whereby the surface of the plastic film has a raised pattern corresponding to the depressions on the master plate, the raised pattern defining depressions in the film. Preferably the material is hardened to a plastic film in contact with the master plate, then stripped therefrom;

(b) filling the depressions in the film with a suspension of ferromagnetic particles in a second film-forming binder material which is curable to a plastic; and (c) curing the second film-forming binder material to a plastic to produce a recording member having disposed therein a patterned distribution of ferromagnetic material.

In a preferred embodiment, the ferromagnetic particles are acicular, and are oriented by a magnetic field prior to curing the film-forming binder material.

The master plate from which the embossed plastic film substrate members are formed can be a flat plate, or cylindrical or indeed of any desired configuration to produce the substrate in the desired form. In some applications, the recording members are required in the form of continuous strips such as tapes. In this case, the master plate can be made in the form of a cylinder which forms one of a pair of rolls, the tape, which should be preformed but having a surface which is flowable under pressure is then fed through the rolls. In some applications, it may be desirable to form the recording member in the form of a cylindrical tube. In this case, the master plate can be made on the interior surface of a hollow cylindrical form, and the plastic-forming material applied to the surface in the form of a liquid, which is then permitted to harden before stripping from the interior of the hollow cylindrical master plate. Other configurations for the master plate will be apparent to those skilled in the art.

The master plate can be made of any suitable material which can be formed with the desired degree of detail. Metals are particularly preferred for the ease with which they can be formed in the desired configuration, and for their durability. It will be apparent that many replications of embossed plastic films can be made from a single master plate.

The master plate can be made by incising the desired pattern such as grooves in the surface thereof, using a lathe for cylindrical configurations, or a ruling machine for flat configurations. Dot patterns can be made using a diamond point which is pressed in to the surface of the metal form.

Alternatively, metal master plates can be electroformed on the surface of softer materials, which can be a photo-engraved plastic plate, or a pressure-sensitive plastic material which has been itself embossed by the application of suitable tools.

Other methods of forming suitable master plates will be apparent to those skilled in the art.

The first plastic film-forming material is applied to the master cylinder having at least its surface in liquid form. The liquid can be a solution of a preformed polymeric plastic material in a suitable solvent. The liquid material can also be a monomer or mixture of monomers together with catalysts, which form the polymer in situ. Prepolymers dissolved in monomers and optionally other solvents such as the known methylmethacrylate polymer casting compositions can also be employed. Curing agents, dyes to modify the transmission characteristics of the substrate and the like can also be incorporated in the liquid casting composition.

The selection of suitable casting compositions will be apparent to those skilled in the art. The finished plastic compositions should possess the following desirable qualities:

(i) Form stability: it should not stretch in normal use.

(ii) Sufficient flexibility and strength to permit stripping from the master plate.

(iii) Capable of adhesion to the second plastic material or binder as described hereinafter.

(iv) Sufficient transmission to radiation, e.g., visible light. While optical clarity is desirable, it is not essential and normally translucent materials can be employed, particularly in thin films.

(v) Sufficient thermal stability in use as a thermomagnetic element.

As examples of suitable polymer solutions for coating can be mentioned polymethylmethacrylate dissolved in acetone; styrene polymer dissolved in benzene; polyvinyl chloride dissolved in tetrahydrofuran and the like.

Examples of monomeric materials which polymerize to plastic material include polyurethane resin coating composition, epoxy compounds mixed with certain curing agents and the like.

Methylmethacrylate prepolymer compositions dissolved in methyl methacrylate monomers can be used.

It is not necessary that the entire substrate be a liquid composition. Films in which the surface has been softened to a flowable condition under moderate pressure by the application of solvents, heat or other means can be employed. Composite, laminated films having a solid polymer layer coated with a liquid plastic-forming composition or coated with a plastic material which can be softened to a flowable condition by heat or solvents can be used. The backing film for the substrate can be molecularly oriented by stretching, rolling and the like to improve strength. In the case of many crystalline polymers, molecular orientation by rolling has the further advantages of improving optical clarity.

The thickness of the substrate is not critical. The minimum thickness will be determined by the depth of the embossed pattern therein. Note that the thickness of stratum to be magnetized including magnetizable species and binder is controlled by depth of embossed pattern. For maximum resolution, i.e., fidelity of reproduction, this stratum should be from 0.01 to 5.0, and most preferably 0.2 to 1.0 mils thick. The thickness of the flexible substrate is generally in the range 0.1 to 25 mils. The most usual thicknesses are in the range 0.2 to 20.0 mils and especially preferred are thicknesses in the range 0.5 to 15.0 mils.

The magnetizable material must be capable of magnetization such that it exhibits energy product $(BH)_{max}$ of 0.08–8.0 gauss oersteds $\times 10^6$, a remanence $B_r$ of 500–21,500 gauss, a coercivity $H_c$ of 40–6000 oersteds, and a Curie-Point temperature of 0° K.–1200° C., preferably from 25° to 500° C. Desirably the magnetizable material should also have as high a saturation magnetization, i.e., $B_s$ as is possible, consonant with the just recited desirable property range. Suitable specific illustrative examples of the magnetizable materials useful in the present invention will be given later. An especially preferred one, because of three desirably interwoven properties, i.e., relatively high coercivity, relatively high remanence at room temperature, and a conveniently accessible Curie temperature, is $CrO_2$.

With respect to the magnetic compounds employed, many materials are useful. Preferably, they should not only exhibit hard magnetic properties, low Curie temperature, high remanence and high coercivity, but also physically should be capable of formulation by conventional techniques into relatively fine particles, preferably acicular, at dimensions approaching single domain dimensions.

A number of factors contribute to the designation of a material as "hard" or "soft" magnetically. Many magnetic materials usually designated as "soft" will show high coercive force when prepared as fine particles. Geometrical factors, including size and shape of the particle, are important. For example, iron is normally considered a "soft" magnetic material with a coercivity of a fraction of an oersted. However, small iron particles composed of single domains with lengths great compared to their diameters can be expected to show coercivities of the order of $10^3$–$10^4$ Oe. In this case, high coercivity is due to shape anisotropy. For other materials, such as manganese bismuthide or cobalt, high coercivity particles may be the result of magnetocrystalline anisotropy arising from an easy direction of magnetization along a particular crystalline direction. Even fine nickel particles should show a high coercivity under uniaxial stress. Many normally "soft" magnetic materials not in single domain form can be made to exhibit a high coercivity after being subjected to cold work or other similar treatments designed to introduce defects or internal strains which serve to pin or block movements of domain walls. Further discussion of "Hard Magnetic Materials" can be found in the article by that title by E. P. Wohlforth, Advances in Physics, supplement to Philosophical Magazine, 8 (April 1959), pp. 87–224, and in the book by R. M. Bozorth on "Ferromagnetism," D. Van Nostrand and Company, Princeton, N.J. (1951), particularly the section on the fine particle, pp. 828–834. "Soft Magnetic Materials" are also discussed widely in the literature, e.g., E. W. Lee and R. L. Lynch, Advances in Physics, supplement to Philosophical Magazine 8 (July 1959), pp. 292–348.

A particularly outstanding species of the magnetic component genus which can be used in formulating the compositions of the present invention is chromium dioxide ($CrO_2$). This material can be used alone, i.e., in substantially pure form, or modified with one or more reactive elements. Suitable descriptions of both the process of preparation and the compositions which have the necessary properties can be found in the following illustrative list of issued U.S. Pats: Arthur, 2,956,955; Arthur and Ingraham, 3,117,093; Cox, 3,074,778; Cox, 3,078,-147; Cox, 3,278,263; Ingraham and Swoboda, 2,923,683; Ingraham and Swoboda, 2,923,684; Ingraham and Swoboda, 3,034,988; Ingraham and Swoboda, 3,068,176; Swoboda 2,923,685.

Suitable materials capable of use in the present process to be magnetized to the hard, magnetic state and then selectively demagnetized include, in addition to $CrO_2$, any of the well-known hard, magnetic materials. Of course, in the case of those with relatively high Cure temperatures, care must be used naturally in selecting the binder, i.e., the matrix in which they are to be dispersed, and also the substrate on which the magnetizable stratum is to be carried. However, such selection is believed to be well within the skill of the art.

Desirably, the material capable of magnetization to the hard, magnetic state in the new thermomagnetic recording members of the present invention will be of particle size of one micron and under, although as is true of most such magnetizable materials, by their very nature they tend to agglomerate and, accordingly, frequently the individual unit dimensions of any one magnetizable area will have agglomerates possibly in the range up to ten mils. In recording and copying techniques, the resolution and the packing factor both are direct functions of the particle size of the working component involved. Thus, a bit cannot be efficiently recorded that is smaller than the particle of the working component through which it is to be recorded. Accordingly, the smaller and more uniform the particle size of the material to be magnetized, the better. Preferably, these particles should be in the range 0.01 to 5 microns, and most especially 0.1 to 2.0 microns.

For application to the embossed substrate film the magnetic material is dispersed in a liquid binder matrix capable of curing to a plastic.

The primary requisites for these binder matrices are that:

(1) they are nonreactive with the magnetic filler, i.e., the working component;

(2) they be thermally stable to reasonable levels, e.g., 200–400° C., for short (milliseconds) periods, and stable to the exposing radiation;

(3) they be preferably flexible and in any event readily processable by conventional techniques such as solution, milling, calendering, extruding, and the like; and (4) they should preferably have low heat conductivity.

Suitable binders include the various commercially available acrylate and methacrylate, as well as functionally substituted acrylate and methacrylate, polymers; the various vinyl and vinylidene polymers and copolymers, such as the vinyl chloride/vinyl acetate, vinylidene chloride/vinyl acetate, and vinyl chloride/vinyl fluoride polymers; the various olefin polymers and copolymers, such as polyethylene and polypropylene; ethylene/vinyl acetate copolymers, ethylene/vinyl chloride copolymers, and the like.

Other binder or matrix materials, including natural, modified natural, and synthetic materials, can also equally well be used, provided they exhibit the fundamentally necessary physical properties of being unaffected by magnetic force fields, not thermally sensitive, and compatible with the magnetic material involved. Suitable more specific matrix materials, in addition to the just previously enumerated specific examples of addition polymers, include such natural matrix materials as tung or China wood and linseed oils, the well-known commercially available epoxy resin formulations, air-settable polyol acrolien acetals and ester formulations thereof, etc., any of the many well-known printing ink and lithographic type varnishes, the natural resins such as Copal, shellac, Damar gum, and the like; the drying oils, any of the many well-known alkyd-based varnish and drying oil-type formulations; the derived natural polymers such as regenerated cellulose, i.e., rayon; cellulose acetate, cellulose acetate/propionate, cellulose propionate, cellulose acetate/butyrate and the like; the synthetic condensation polymers such as the well-known nylons, e.g., polycaprolactam, polyhexamethyleneadipamide, polurethanes, e.g., that from ethylene glycol/adipic acid/tolylene diisocyanate, as well as the polyurethanes based on relatively high molecular weight addition glycols such as that from a polytetramethylene ether glycol obtained by ring opening of tetrahydrofuran/adipic acid/tolylene or hexamethylene diisocyanate/with, if desired, a finishing diamine, such as hexamethylenediamine, and the like; or like mixed ester/amides and synthetic condensation polymers derived therefrom such as polyhydroxymethyl polyhexamethyleneadipamide, and the like; thermosetting resin binders or matirces such as, for instance, the polyureaformaldehyde and modified polyureaformaldehyde compositions wherein the modifying component can be, for instance, an amine such as hexamethylenediamine and the like.

In addition to the foregoing largely wholly organic binders and matrices, suitable inorganic binders and matrices can be used, which may be transparent to the exposing radiation. Suitable examples include the silicones, the Ludox® silicas, aluminum oxide film-formers, titanate film-formers which can be dispersed or substantially vapor deposited and heat set, and the like.

The magnetic material, dispersed in a sufficient amount of the binder material to allow the particles to adhere to each other and to the substrate, can be applied to the embossed substrate by a doctor knife, wiping or the like so that the surface the magnetic material is level with the raised portion of the embossed pattern in the substrate plastic film.

Preferably shape anisotropy, or magnetocrystalline anisotropy, is used in the preparation of the image plates or films of the present invention to obtain a preferred orientation of the magnetic particles either in the coating direction, or perpendicular to the surface of the film. Thus for perpendicular orientation this can be obtained by letting the magnetizable material and binder dry and/or cure in a perpendicularly applied magnetic field, or for thermoplastic binders operating at a sufficient elevated temperature so that it is flowable, but such temperature still being below the Curie temperature of any magnetized material, and letting cool in the prependicularly applied magnetic field to room temperature. Similarly, for parallel orientation, i.e., in the coated direction, the cast coating, whether by solvent or by thermoplastic techniques, before setting is drawn directly across the pole pieces of a magnet oriented with the fixed axes thereof in the line of flow of tape movement.

The copying member, i.e., the magnetic stratum and its allied support, must have finite percentage transmission characteristics. With respect to the exposing actinic radiation, successful copying has been achieved with as low as about 2% transmission to the exposing radiation, thereby achieving a percent demagnetization of as high as approximately 60%. However, at these extremely low transmission ranges, the energy density necessary to achieve this percent demagnetization will run around 270 millijoules/cm.$^2$. Of course, in the higher percent transmission ranges with respect to the copying member and the exposing actinic radiation, it has been successfully established that transmissivities as high as 99% can be used successfully for copying, provided that the magnetic stratum has a sufficiently high coercivity and remanence.

Normally speaking, the percent transmission of the copying member with its allied magnetic stratum, and/or binder if necessary, will lie in the range 10–90% with respect to the exposing copying radiation. Best results, however, will be obtained with those copying members and exposing radiation wherein the percent transmission of the copying member to said radiation will lie in the range 50–80%. As a further corollary of the percent transmission of the copying member and the necessary intensity of exposing radiation for copying, it will obviously be preferred that the two will be chosen (and they necessarily are interrelated) so that the minimum intensity of exposing radiation as a function of the percent transmission will be at the minimum consonant with the achievement of a good contrast demagnetized image. Ideally then, the copying member will be so formulated that the percent transmission thereof to the exposing radiation will be such that the energy density on exposure at the copying surface necessary to achieve significantly high percentages of demagnetization of the magnetized stratum, e.g., 80–100% and preferably 90–100% demagnetization, will be achievable at energy density values at the copying surface no higher than 250 millijoules/cm.$^2$ and preferably in the range no higher than 200–240 millijoules/cm.$^2$.

This result can also be achieved by adjusting the ratio of the surface area of the magnetic material to the surface area of the transparent portions of the copying member.

THE DRAWINGS

The accompanying drawings illustrate some of the various modifications of the copying members which can be produced by the process of the present invention, and also show, in the form of a block diagram, the various steps employed in the method. Throughout these drawings the same element is indicated by the same number. The drawings are not to scale.

FIG. 1 is a view from above of a recording member consisting of a substrate plastic film 20 in which "lines" 21 of magnetic material are held within groove (22; FIG. 2) in the tape;

FIG. 2 is a reduced section along line 2—2 through FIG. 1 showing the lines 21 set in grooves 22 of substrate film 20;

FIG. 3 is a view from above of a recording member wherein "dots" 24 of magnetic material are set within holes in substrate film 20;

FIG. 4 is a view similar to FIG. 3 showing, however, a different arrangement of dots 24;

Figure 11:
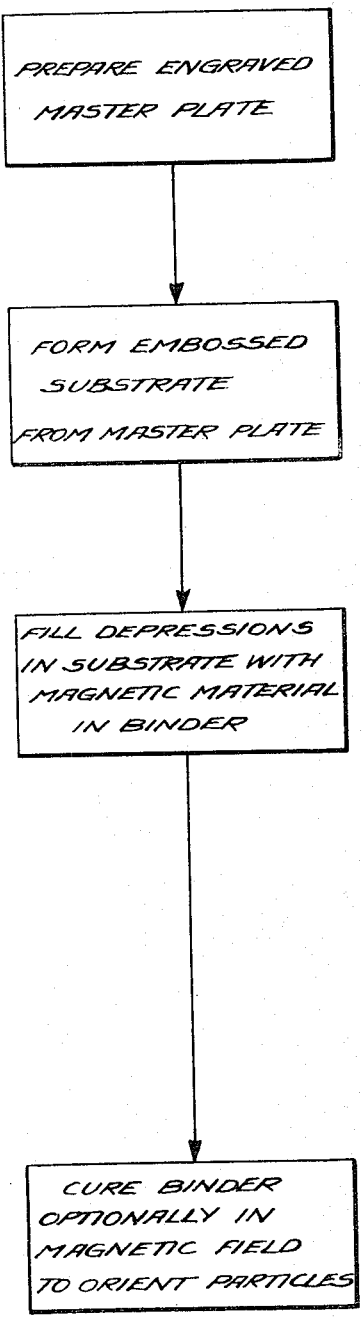

FIG. 5 is a reduced section along line 5—5 of FIG. 4 showing the holes 23 in which the dots 24 are set;

FIG. 6 is a section through a laminated recording member in which substrate plastic film 31, containing dots 32 and 33 of different depths of magnetic material, is firmly bound by an adhesive layer 34 to a carrier film 35 (see Example 6, infra);

FIGS. 7, 8 and 9 are enlarged sections through substrate film 40 showing different configurations 41, 42 and 43 which may represent cross-sections, either hollow retaining means for either dots (holes) or lines (grooves) of magnetic material; and FIG. 10, like FIGS. 1, 3 and 4, is a view from above of a film 45 carrying, however, both lines 46 and dots 47 of magnetic material.

FIG. 11 is a block diagram illustrating the sequence of steps in the process of this invention.

While the drawings have illustrated a line plate with regularly disposed, uniform width, evenly spaced, magnetic lines and a dot plate with regularly disposed dots in equally spaced rows and columns and of the same diameter as indicated in FIG. 4, this high order of regularity is not absolutely necessary, although desired. Thus, it is within the purview of this invention to use as a reflex matrix master for reflex exposure for reflex exposure a plate containing both lines and dots of equal or different dimensionalities, either equally spaced or substantially evenly spaced. The controlling factor remains whether or not the reflex matrix master plate has the percentage light transmission within the limits discussed in the foregoing and at the same time has the magnetic component of sufficient strength to give a good magnetic signal as described in the foregoing packing limits.

THE SPECIFIC EMBODIMENTS

This invention is further illustrated by the following specific embodiments which should not, however, be construed as fully delineating the scope thereof.

Example 1

Shallow parallel grooves were machine cut into a polished 1" square surface of a 1" x 1" x ¼" brass block to obtain 1000 grooves, 0.5 mil (0.0005") wide, 0.2 mil (0.0002") deep, and 0.5 mil apart, all on centers. The 1000 lines per inch (LPI) grooved surface of the block (or master mold) carrying the lined intaglio text, mounted horizontally, was wetted with excess tetrahydrofuran and an excess of a 12.5% solution of high molecular weight polyvinyl chloride (PVC) (Goodrich Chem. Co.'s Geon® 101 EP) in tetrahydrofuran was applied to the center of the wetted surface. Upon drying and stripping there was obtained a bubble-free, clear, transparent PVC film having on one surface an opposite height relief image of the grooved metal surface, the film having a thickness of approximately 8–10 mils.

A 15% solution consisting of 50.4 parts of medium molecular weight polymethylmethacrylate (Lucite® 41) in 285.6 parts of toluene was ball-milled for 174 hours with 50.4 parts of chromium dioxide (prepared as described in Cox, U.S. 3,278,263), having an $iH_c$ of 401 oersteds, $\sigma_s$ of 80 emu./g. measured at 4400 oersteds, and 4 parts of isooctylphenoxypolyethoxyethanol (Triton® X–100, a commercially available nonionic dispersing agent). This $CrO_2$ suspension was used to fill the 0.2 mil deep grooves of the above 1000 LPI relief image film, excess being removed by wiping the filled film against bond paper slightly moistened with toluene to assure overall surface planarity of the composite filled film.

The filled film, after drying, was magnetized in an average 1500-gauss magnetic field and placed with the filled side in contact with a Bureau of Standards resolution chart containing printed figures and a series of black lines. An electronic flash unit (Ultrablitz Cornet M) with a capacitance of 300 μf. was charged to 500 volts and discharged through the back of the magnetized film. The film was separated from the chart and then immersed briefly in a suspension of fine metallic iron powder in a hydrocarbon solvent (Visimag® F) and dried in air. The iron particles were observed to cling to the portions of the $CrO_2$-containing film corresponding to the image areas of the original black line images and printed figures. The iron powder pattern was then transferred by slight pressure onto a pressure-sensitive adhesive sheet, giving a right-reading positive copy with good fidelity, resolution, and contrast of the original chart on the sticky side of the adhesive sheet.

Example 2

A brass cylinder, 2" in diam. and 3" long, was cut on a lathe and the surface of the cylinder was mirror polished. A spiral groove 0.2 mil deep and 0.5 mil wide with adjacent annular grooves spaced 0.5 mil apart, all on centers, was cut into the surface of the cylinder, thus giving 1000 grooves per inch. A very thin hard chromium electroplate with an estimated thickness of 0.05 mil was applied to the surface of the grooved cylinder.

The grooved and plated cylinder was mounted in a horizontal position so that it could be rotated axially on its major dimension. The end of a 3" x 6" piece of cellulose acetate film of 3 mils thickness was fastened to the surface of the cylinder in an axial direction using pressure-sensitive adhesive tape. A jet of acetone from a wash bottle was directed into the nip of the film as it was wrapped around the cylinder by rotating the cylinder. The other end of the film was fastened to the cylinder with tape and the entrapped acetone layer was allowed to evaporate through the film. The dried film on removal from the cylinder was found to have, embedded in its surface, an exact opposite height relief image of the 1000 LPI 0.2 mil deep grooves on the surface of the cylinder.

A solution was prepared from 75 parts of polyvinyl alcohol (PVA) containing some unhydrolyzed acetate groups (Du Pont Elvanol® 51–05) and 175 parts of dimethyl sulfoxide (DMSO). This was passed six times through an ink mill with 112 parts of chromium dioxide ($iH_c$ 594 oersteds, $\sigma_s$ 82 emu./g., $\sigma_s$ 41 emu./g.) and 3 parts of Triton® X–100, using added dimethyl sulfoxide to maintain the desired milling viscosity. The resulting paste was doctored into the grooves of the 3" x 6" relief image film, with the doctor blade held substantially parallel to the grooves. The surface was cleaned of material adhering to the narrow surfaces between the filled grooves to assure uniform surface planarity and the film was allowed to dry.

The filled film was magnetized, flashed, developed, and printed as described in Example 1, but the printed image was not as intense as that obtained in Example 1 since the grooves were somewhat less sharp and overall shallower than those of Example 1.

Example 3

A copper plate having 750 grooves per inch was prepared by photoengraving process involving exposing a thin layer of a commercial water-soluble/light insolubilizable photoresist on a smooth copper plate through a 750 line-pattern negative, dissolving with water the unhardened resist in the unexposed areas corresponding to the black line areas of the negative, etching grooves to a controlled depth of about 0.3–0.5 mil, and finally removing the remaining hardened resist. A relief image was made of the etched surface by flooding it with acetone while supported horizontally and squeegeeing a 3-mill cellulose acetate film onto the wetted surface and letting it dry while in intimate contact with the etched plate. After separation, the dry film, which was a relief image of the above etched surface, was filled with the $CrO_2$/PVA/DMSO magnetic paste of Example 2 using a parallel block held at a 45° angle as the doctor knife.

The above film was used in printing a right-reading positive image by reflex thermomagnetography as described in Example 1.

Example 4

A Dycril® photopolymer printing plate with 750 recesses per inch (each about 0.3 mil deep) in each direction of the two dimensional surface was prepared from a 750 LPI dot negative. An opposite height relief image of this Dycril® plate was prepared using General Electric's liquid, air/room temperature hardenable silicone resin, RTV–11. An opposite height relief image of the silicon surface was in turn prepared by use of a room-temperature, hardening mixture of commercial liquid epoxy resins (Union Carbide's ERL 2795 and 2793). The relief image thus obtained in the hardened epoxy was silver sprayed and plated with nickel in an electrochemical nickel sulfamate bath until a nickel plate of approximately $\frac{1}{32}''$ thickness was obtained, the surface of the nickel thus being an exact relief image (intaglio) of the original Dycril® plate. By applying a 3-mil cellulose acetate film to the acetone-wet surface of the nickel plate in intimate surface to surface contact and allowing it to dry, a relief image of the nickel plate was obtained which was an exact opposite height relief replica of the original Dycril® plate.

The regularly disposed pits or indentations in the cellulose acetate replica were filled with the $CrO_2$/PVA/DMSO magnetic paste of Example 2. The area between the filled grooves was wiped free of excess paste without difficulty.

The dried, filled film was magnetized in an average 1500-gauss field, placed face down on a printed resolution chart (Bureau of Standards) and flashed through from the back using a G.E. FT 91/L xenon flash tube in a spherical reflector operated from a 140 μfd. capacitor bank charged to 900 volts. The output energy of the lamp at the 4″ distance employed was 0.15 joule/cm.² at the filled film surface. The flashed $CrO_2$-filled film was developed in a suspension of type GQ4 carbonyl iron powder (General Aniline & Film Corp.) in 1,1,2 - trichlorotrifluoroethane (Du Pont Freon® TF). The developed image was transferred by pressing it against an adhesive-coated white paper thereby giving a right-reading print of the resolution chart with good fidelity, resolution, and contrast.

Example 5

A 6″ x 6″ etched copper plate having a 750 LPI recessed dot pattern was made by the process of Example 3. It was pressed into a soft lead sheet using a total pressure of 1200 tons. From this lead sheet 3-mil thick cellulose acetate film replicas of the original copper plate were prepared by the method described in Example 3. One of the above cellulose acetate replica films was filled with the $CrO_2$/PVA/DMSO paste of Example 2 and the flat area between the filled pits was easily wiped clean of excess paste. The filled film was used in the development and printing of a reflex thermomagnetic image as described in Example 4.

Example 6

A 3-mil Mylar® polyester sheet was coated with a thin layer of a solution in methyl ethyl ketone of a thermoplastic amorphous polyester adhesive. While the adhesive layer was still wet, a 3-mil cellulose acetate sheet was rolled onto it and the laminated film was allowed to dry. A 750 LPI line pattern electroformed plate with about a 0.3-mil high relief was pressed into the cellulose acetate side of the laminate at 125° C. in a Carver press using a pressure of 1000 p.s.i. for two minutes to give an opposite height relief image of the electroform. As an alternative method, the adhesive coating on the polyester film was allowed to dry first and the cellulose acetate film was caused to adhere to the polyester film during the embossing step, carried out as described above.

The laminated cellulose acetate-on-polyester films having 750 grooves per inch pressed into their surface were filled with an ink-milled paste made up from 70 parts of chromium dioxide ($iH_c$ 594: $\sigma_s$ 82; $\sigma_r$ 41, cf. Example 2) and 30 parts epoxy resin (Bakelite ERL 2795) with sufficient added 2-butoxyethanol to give the desired milling viscosity. After partial curing at room temperature using tetraethylenepentamine (TEPA) curing catalyst, excess paste was cleaned from the top surface of the film, leaving the grooves filled to the upper surface. The curing of the epoxy binder was completed by leaving the filled film at 50° C. for 16 hours.

The dried, filled film was magnetized in an average 1500-gauss field, placed with the filled surface in contact with a printed resolution chart (Bureau of Standards), and flashed from the back with a xenon flash lamp as before. The latent magnetic image was developed in an aqueous dispersion of a toner consisting of 5–10μ particles of a 70/30 mixtures of $Fe_3O_4$ and a thermoplastic polyamide (General mills' Versalon® 1112) spray-dried from n-propyl alcohol. The developed image was transferred to paper using heat and pressure to give a clean, dark, right-reading print of the resolution chart with good fidelity, resolution, and contrast.

Example 7

A thin coating of an amorphous polyester adhesive was applied to flame-treated 5-mil Mylar® polyester film. A solution of a 66/610–6 nylon polyamide resin (Zytel® 61) in 88% ethanol was cast onto the subbed polyester film and allowed to dry. The resultant about 0.8–1.0 mil thick nylon surface of the composite film was embossed with the 750 LPI line pattern electroformed plate as per Example 6 at 140° C. and 1000 p.s.i. for three minutes.

The resultant embossed composite film was filled with the magnetic paste of Example 6. Some difficulty was encountered in cleaning the excess paste from the top surface of the film. The filled film was cured and used to copy the printed resolution chart all as described in Example 6.

Example 8

A solution made from 15 parts of high molecular weight ethyl cellulose, 203 parts of tetrachloroethylene, and 100 parts of 4-methyl-2-pentanone was cast on 5-mil flame-treated Mylar® polyester film coated with a thin layer of amorphous polyester adhesive and allowed to dry. The resultant about 0.8–1.0 thick ethyl cellulose face of the composite film was embossed with a 750 LPI dot pattern electroformed nickel plate as per Example 6 at 125° C. at 600 p.s.i. for three minutes. The embossed film was filled with the magnetic paste of Example 6, wiped clean after partial curing at room temperature, and finally cured overnight at 50° C. The cured, filled film was used in reflex thermomagnetographic copying of the resolution chart as described in Example 6.

Example 9

A solution of 30 parts of a commercial polycarbonate resin (General Electric's Lexan® 105) in 216 parts of 1,1,2-trichloroethane was cast on 5-mil Mylar® polyester film which had been precoated with a thin film of an amorphous polyester adhesive mixed with a modified diisocyanate and allowed to dry. The resultant about 0.8– 1.0 mil thick polycarbonate surface of the composite film was embossed as per Example 6 with a 500 LPI dot pattern electroformed plate at 180° C. under 600 p.s.i. for three minutes. The regularly spaced, minute pits were filled with an ink-milled paste composed of 70 parts $CrO_2$ ($iH_c$ 417 Oe.; $\sigma_s$ 79 emu./g.; $\sigma_r$ 38 emu./g.) in an alkyd varnish (Archer-Daniels-Midland's Aroplaz® 1271), followed by partial air/room temperature curing, wiping, and air-drying. The cured, filled film was used to copy the resolution chart as described in Example 6.

Example 10

A 500 LPI dot pattern electroformed plate with about a 0.3 mil relief mounted horizontally was flooded with methylene chloride, a 5-mil thick Lexan® polycarbonate film was squeegeed onto it, and the polycarbonate film in turn was cover with a thin Mylar® polyester film held flat with a metal plate. After 10 minutes the uppr metal plate and polyester film were removed and the methylene chloride was allowed to evaporate through the polycarbonate film. When completely dry, the polycarbonate film was removed from the electroform and was found to have impressed in its surface an opposite height relief image of the electroform.

The regularly pitted surface of the polycarbonate relief image film was filled with an ink-milled paste composed of 70 parts of chromium dioxide and 30 parts of a liquid alkyd resin binder (cf. Example 9). Excess paste was removed after partial air/room temperature curing, leaving each pit filled to the top, with no paste on the flat areas between the pits. Final curing in air was accelerated by heating at 45–50° C. overnight.

The cured film was used in the copying of typewritten material on white paper by the process described in Example 6 where the typed copy was substituted for the resolution chart.

Example 11

A 500 LPI dot pattern electroform as in Example 10 was pressed into 10-mil unsupported Lexan® polycarbonate film at 180° C. under 600 p.s.i. for five minutes. The resultant opposite height relief image film was filled with an ink-milled magnetic paste composed of 70 parts chromium dioxide ($iH_c$ 424 Oe.; $\sigma_s$ 80.3 emu./g.; $\sigma_r$ 36.7 emu./g.) and 30 parts of a commercial epoxy resin (Bakelite ERL 2795) catalyzed by TEPA. The film surface was cleaned of excess black paste after partial air/room temperature curing, and curing was completed by overnight heating at 40–50° C.

The cured, filled film was used in reflex thermomagnetic copying of the resolution chart as described in Example 6.

Example 12

A 4½" x 5" solvent replicated cellulose acetate film containing 500 lines/in. was prepared as in Example 3 and the grooves therein filled, using the straight edge of a doctor knife, with a dispersion of 6.1 parts of the $CrO_2$ of Example 11, 1.5 parts of epoxy resin (Bakelite ERL 2795), 2.9 parts of butyl Cellosolve, and 0.2 part of TEPA. The coated film was then placed between the two attracting poles of an electromagnet having a magnetic field of 4,000 gauss and hot air from a hand blower was applied for about five minutes. The film was then removed from the magnetic field, allowed to stand at room temperature for two days, and then heated at 50° C. for 16 hours for final curing. Excess coating on the film surface was removed by wiping with soft tissue paper. The vertical orientation of the magnetized $CrO_2$ particles was 92% as determined by X-ray reflection diffractometry showing the degree of the preferred alignment of the c-axis normal to the plane of the film. Exposure and development as in Example 6 with a development time of 3 seconds gave a faint copy density. Longer development times up to 9 seconds gave a fairly dense copy and marked resolution of the transferred image.

Example 13

A horizontally oriented film was prepared using the same procedure as in Example 12 except that the freshly coated film was passed six times between the opposing poles of two U-magnets having a magnetic field of 4,000 gauss. The horizontal orientation of the $CrO_2$ particles was 91.3% as obtained by X-ray transmission diffractometry showing the extent of the preferred alignment of the c-axis of said particles parallel to the length of the film. Exposure and development as in Example 12 gave a good, black development with a fairly good amount of resolution.

Orientation of the magnetic material in the reflex copy films of the present invention greatly improves the magnetic properties of the reflex films. In orienting the magnetic particles, e.g., $CrO_2$, within the discrete surface areas, e.g., grooves, higher magnetic remanent values are obtained resulting in a squarer hysteresis loop which is needed for a greater magnetic output for the reflex imaged film. This enhances the attraction for toner particles during development. Orientation can be done in two directions: one along the length of the copying member, i.e. in the plane thereof, called horizontal orientation; the other perpendicular to the plane of the film, termed vertical orientation.

Both types of orientation require a certain range of viscosity of the magnetic formulations wherein the particles of the magnetic material can move freely and align themselves along the direction of the applied magnetic field. For $CrO_2$-based compositions as above, a viscosity of 40,000 cps. (using a Brookfield Viscometer with a No. 7 spindle at 50 r.p.m. and at 22° C.) was found to be the maximum value of viscosity permitting orientation. The preferred viscosity range is 30,000–40,000 cps. Below about 10,000 cps. agglomeration rather than orientation can occur.

Vertical orientation is achieved by placing the freshly coated film between the two attracting poles of an electromagnet with higher degrees of orientation varying in the same direction with higher magnetic field strength. A field of 4000 gauss results in 85–92% vertical orientation as determined by the X-ray diffraction pattern resulting from the reflection of the 002 plane of the acicular $CrO_2$ particles.

Horizontal orientation is achieved by passing the freshly coated film between the opposing poles of two U-magnets which provide a range of 3,000–8,000 gauss for orientation depending on the distance between the two magnets and the width of the gap at the center. By passing the film six times at a field of 4,000–6,000 gauss, 90–92% orientation could be attained. In both types of orientation, hot air is applied immediately after orienting to volatilize the solvent in order to hold the particles in the preferred direction of magnetization. The amount of horizontal orientation is determined by X-ray transmission diffractometry whereby the degree of the preferred alignment of the c-axis parallel to the length of the reflex film is measured.

Machine testing of the films with the above types of orientation showed a much better imaging quality for the horizontally oriented particles whether on dots or on line patterns. The copies obtained with horizontal orientation were much better in terms of copy density while the vertically oriented films gave only a fair amount of reflectance density. These tests were made with a development time of three seconds. If development times were prolonged, the vertically oriented film gave better resolution of the images although the horizontally oriented films still gave much denser copies.

Example 14

An iron oxide (99.0% $\gamma\text{-}Fe_2O_3$) ink was prepared by mulling for 300 passes on a mechanical muller a mixture of 4 parts of a fine, commercially available iron oxide (J. Lee Smith Company product HR–280) of $iH_c$ 260 oersteds, one part of a commercially available, long-oil-linseed alkyd of acid value 6–10 (Archer, Daniels, Midland, Aroplaz 1271), and 3 parts of Stoddard solvent. The resultant thick ink was used to fill the lines of a 25 sq. in.

commercially available polycarbonate film (General Electric Company's Lexan®), which was embossed as in previous examples with a line pattern of 500 LPI. The thus-filled sheet was dried for two days under atmospheric conditions and the surface then cleaned and polished with a fine alumina abrasive. Finally, the polished sheet was dried at 55° C. under reduced pressure. The resultant reflex matrix master was magnetized by pulling over the edge of a highly magnetized steel plate.

The resultant magnetized line reflux matrix master was placed face to face with a 5-mil thick polyethylene terephthalate film carrying a layer of $CrO_2$ in a polyvinylidene chloride binder, said $CrO_2$ exhibiting an $iH_c$ of 314 oersteds and the two were heated under 200 pounds pressure between squared, smooth, aluminum plates in a Carver press at 130° C. for two minutes and the assembly then cooled rapidly with cold water. This pressing temperature is above the Curie temperature of the $CrO_2$, and, by cooling down through the Curie temperature in contact with the $\gamma$-$Fe_2O_3$ line master reflex matrix, a corresponding line magnetic image was formed in the $CrO_2$ layer.

The magnetized line $CrO_2$ plate was selectively demagnetized by projection through a positive transparency containing both line and halftone copy at 80° C. using a xenon exposure lamp at 1000 volts. The thus-exposed $CrO_2$ film was developed by dipping into a dilute alkyd oil/water magnetic emulsion ink with stirring. After development for 20 seconds the $CrO_2$ film was passed in front of an air knife to remove ink from the nonsignalled areas and the thus-developed $CrO_2$ film was pressed by means of a rubber roller in face-to-face contact with a transfer paper (conventional bond paper), whereby there was obtained on the bond paper a print of the text of the original projection transparency showing good resolution and fidelity in both letter and halftone areas. Substantially the same results were obtained using an inverted positive transparency to afford right-reading copy, and also by picking up the developed magnetic image on a rubber offset blanket with subsequent transfer to the receptor sheet as in offset printing.

The dilute alkyd-oil/water emulsion magnetic ink containing encapsulated pigment was prepared by mixing 5 parts of carbonyl iron powder, 5 parts of a commercially available long-oil-alkyd for ink use (Lawter Chemical Company, Terlon® No. 7), 2 parts of an aliphatic mineral oil containing 0.2 part of a commercially available carbon black for printing ink use (Raven 30), 6 parts of a mill blend containing 3 parts of a commercially available octahedral $Fe_3O_4$ (C. K. Williams IRN351), 3 parts of mineral oil, and 3 parts of a commercially available dispersing gent—Sorbitan monolaurate (Span 20). This oil phase was stirred rapidly with a single paddle while adding to the slurry a solution containing 60 parts of water and 2 parts of a commercially available polyoxyethylene Sorbitan monolaurate (Tween 20). A thick water/oil paste emulsion formed first, and inversion to an oil-water emulsion occurred after 50 parts of solution was added. This suspension contained oil-alkyd droplets 3–12μ in diameter with the pigment encapsulated therein. For development, the concentrated suspension was diluted with 320 parts of water and efficient stirring was maintained.

Example 15

A commercially available conversion film (Du Pont's Cronapress® having an opaque, porous-coalescible or opaque, pressure-clarifiable (OPC) coating 0.4 mil thick on a 5-mil oriented polyethylene terephthalate support film was carefully cleaned and wrapped on a 4" diameter metal mandrel with vacuum hold-down holes in the edges thereof fitted on a precision lathe. The mandrel was evacuated thereby holding the polyester film firmly in place on its surface and a rotary tool was used to collapse a narrow groove in the soft pressure-clarifiable coating down to the interface with the polyester substrate. The rotary tool had a cutting edge handhoned from a 0.025" thick tool-steel blade tapered to a 0.0003" land at its tip. This rotary tool was advanced by the lead screw on the lathe to cut 480 lines per inch in the OPC film using ethanol as a film/cutting lubricant operating under a protective dust cover.

An electroless copper layer was then deposited on the thus scribed Cronapress® film surface using a commercially available copperplating system (Enthone Corporation, New Haven, Conn.). The scribed film was first placed in a flat tray with the soft coating side up for one minute in a solution of 40 cc. of Enplate® 432 in 600 cc. of distilled water. The thus treated scribed plate was then gently rinsed in distilled water and immersed for three minutes in a solution of 40 cc. Enplate® 440 in 600 cc. of distilled water, followed by another rinse in distilled water, and finally immersed for 15 minutes in a solution of 80 cc. of Enthone Cu 400A, 200 cc. of Enthone Cu 400B, and 360 cc. of distilled water. A copperplating approximately 15 microninches thick was thus formed on the surface of the film. The thus copperplated film was further plated in a commercial nickel-plating bath operating at 110° F. at 1.50 volts for 18 hours to give a nickel plate 14 mils thick.

The scribed Cronapress® film was stripped from the copper layer and the electroless copper layer was next removed from the nickel plate with a dilute aqueous chromic acid (4 oz. per gal.)-sulfuric acid (0.4 oz. per gal.) solution.

A 15" x 16" section of a commercially available flame-treated polyester terephthalate film (Du Pont's Mylar® 500A) was backcoated to prevent curling with a 0.4 micron thick coating of a commercially available polyether urethane finish (Du Pont's Imron® RK801 consisting of a 45% by weight solids solution in 3 parts toluene, 2 parts xylene, and one part Cellosolve acetate of 1.0 mole polypropylene glycol of molecular weight 1025, 1.22 moles of trimethylolpropane, 5.21 moles of a mixture of 2,4- and 2,6-toluene diisocyanates, and 0.3 weight percent of dimethyldodecylamine catalyst) applied at a 5/1 weight ratio acetone/RK801 solution from a 10" wide hopper coater having a ⅛" wide slit covered with Whatman No. 1 filter paper and a fine mesh nylon bolting cloth. This backcoating was allowed to air-cure overnight and while preventing curling of the final film, it should be pointed out, is not necessary. The other side of the thus backcoated film was then coated with the same Imron® RK801 syrup at 45 weight percent solids using a doctor knife setting of 15 mils. The coating was allowed to cure at room temperature 16½ hours until it was tack-free and approximately 3 mils thick.

The above-described nickel line plate was used to emboss the 3-mil thick Imron® coating at 125° C. for five minutes at 625 p.s.i. On the following day the embossed film was filled with a thick paste made by ink milling 80 parts of $CrO_2$ and 20 parts of a commercial, curable alkyd binder (Aroplaz® 1271) milled 40 passes on a three-roll ink mill. During milling and coating, the $CrO_2$ alkyd dispersion was diluted with Stoddard solvent so that at the time of coating the viscosity was approximately 60,000 centipoises. The embossed Imron® film was taped down to a clean, smooth work area (a ¼" thick gum rubber pad covered by 5-mil Mylar®) for the filling operation. The filling was carried out by placing a bead of the $CrO_2$/alkyd/Stoddard solvent ink-milled dispersion in front of a ⅛" radius steel doctor knife. The doctor knife was held at an angle of 30–35° and was drawn over the area to be coated in a single continuous operation. Several more passes with the doctor knife were then made in rapid succession as the Stoddard solvent evaporated. This took about 30 seconds of elapsed time. A final pass with a sharp edge knife was used to remove most of the excess dispersion from the surface. The alkyd binder was allowed to cure at room temperature overnight. Excess $CrO_2$ and alkyd binder were cleaned from the surface of the film by gentle abrasion with 0.3 micron aluminum oxide particles dispersed in water.

The CrO$_2$-filled film was next topcoated with approximately 0.4 micron of the Imron® RK801 polyether urethane exactly as described for the original backside coating above. The final filled film contained approximately 3.27 grams of CrO$_2$ and alkyd binder per square meter. This film was used to make reflex exposures that were developed by aqueous toner dispersions to give excellent copies of the originals as described in previous examples.

The thermomagnetic copying members described hereinabove are particularly suited to the thermomagnetic copying of documents which can be read by eye, i.e., those which selectively reflect visible light. However, it will be realized that by suitable modification of the materials employed for the substrate and binder, in accordance with the known properties of the materials, the copying members can be employed using electromagnetic radiation, outside the visible region of the spectrum, or with particulate radiation capable of heating the ferromagnetic material which is selectively reflected by the document.

The foregoing detailed description has been given for clarity of understanding only and no unncessary limitations are to be understood therefrom. The invention is not limited to the exact details shown and described for obvious modifications will be apparent to those skilled in the art.

The embodiments of the invention in which an exclusive property or privilege is claimed are defined as follows:

1. The process of preparing a thermomagnetic recording member which comprises:
    (a) placing a first plastic transparent film-forming material having at least its surface in flowable condition upon the engraved surface of a master plate from which the material can readily be stripped, and permitting the material to harden to a film, whereby the hardened film has a raised pattern on the surface thereof corresponding to the depressions on the master plate, said raised pattern defining depressions in the film and stripping the hardened film from the master plate;
    (b) filling the depressions within said hardened film with a suspension of ferromagnetic particles in a second liquid film-forming binder material, said second film-forming binder material being curable to a plastic;
    (c) curing the second film-forming binder material to a plastic, to produce a planar recording member having disposed therein a patterned distribution of ferromagnetic material; and
    (d) removing any excess suspension material from the surfaces between the depressions.

2. The process of claim 1 wherein the first plastic film-forming material is applied to the surface of the master plate as a liquid, and hardened in contact with the master plate.

3. The process of claim 2 in which said plastic film-forming material is a solution of polyvinyl chloride.

4. The process of claim 2 in which the said plastic film-forming material is a solution of a polycarbonate resin.

5. The process of claim 1 in which the first film forming material consists of a preformed plastic sheet having its surface in flowable form.

6. The process of claim 5 in which the surface of said preformed plastic sheet is softened by solvent.

7. The process of claim 6 in which the preformed plastic sheet is cellulose acetate, the surface of which is softened with acetone.

8. The process of claim 6 in which the said preformed plastic sheet is a polycarbonate resin, the surface of which is softened with methylene chloride.

9. The process of claim 5 in which the surface of the preformed plastic sheet is softened by heat.

10. The process of claim 9 in which the preformed plastic sheet is cellulose acetate.

11. The process of claim 9 in which the preformed plastic sheet is a polyether urethane.

12. The process of claim 1 in which the ferromagnetic material is in the form of fine acicular particles which are oriented by a magnetic field prior to curing the second liquid binder material.

References Cited

UNITED STATES PATENTS

| 2,046,954 | 7/1936 | LaVerne et al. | 264—255 X |
| 3,061,500 | 10/1962 | Kreier | 264—247 X |
| 3,085,295 | 4/1963 | Pizzino et al. | 264—255 |
| 3,141,407 | 7/1964 | Leeds | 264—226 X |
| 3,265,776 | 8/1966 | Henkes | 264—227 X |
| 3,325,339 | 6/1967 | McBournie | 117—235 X |
| 3,408,437 | 10/1968 | Wheeler et al. | 264—226 |

FOREIGN PATENTS

| 755,024 | 3/1967 | Canada. |
| 982,464 | 6/1951 | France. |

ROBERT F. WHITE, Primary Examiner

A. M. SOKAL, Assistant Examiner

U.S. Cl. X.R.

264—104, 108, 250